United States Patent [19]

Matsuoka et al.

[11] Patent Number: 4,787,075
[45] Date of Patent: Nov. 22, 1988

[54] OPTICAL INFORMATION RECORDING MEDIUM AND APPARATUS FOR RECORDING/REPRODUCING INFORMATION USING THE SAME

[75] Inventors: Hiroshi Matsuoka, Kawasaki; Akio Aoki, Tokyo; Hideki Hosoya, Yokohama; Kazuhiko Matsuoka, Yokohama; Masayuki Usui, Yokohama; Kazuo Minoura, Yokohama; Fumiaki Kawaguchi, Tokyo; Masahiko Enari; Kenichi Suzuki, both of Yokohama; Satoshi Shikichi, Tokyo, all of Japan

[73] Assignee: Canon Kabushiki Kaisha, Tokyo, Japan

[21] Appl. No.: 810,747

[22] Filed: Dec. 19, 1985

[30] Foreign Application Priority Data

Dec. 26, 1984 [JP]  Japan .................................. 59-276942
Dec. 27, 1984 [JP]  Japan .................................. 59-275760
Dec. 28, 1984 [JP]  Japan .................................. 59-276991

[51] Int. Cl.[4] .............................................. G11B 7/09
[52] U.S. Cl. ........................................ 369/44; 369/45; 369/46; 369/279; 250/202; 235/454
[58] Field of Search .................... 369/44, 45, 46, 275, 369/97, 93, 95, 47, 48, 49, 59, 102, 277, 278, 279; 250/201, 202; 360/77; 235/454

[56] References Cited

U.S. PATENT DOCUMENTS

| 3,438,050 | 4/1969 | Aschenbvnnes | 346/49 |
| 4,337,534 | 6/1982 | Basilica | 369/46 |
| 4,443,870 | 4/1984 | Hazel | 369/44 |
| 4,598,196 | 7/1986 | Pierce | 235/457 |
| 4,598,393 | 7/1986 | Pierce | 369/46 |

*Primary Examiner*—Alan Faber
*Attorney, Agent, or Firm*—Fitzpatrick, Cella, Harper & Scinto

[57] ABSTRACT

An optical information recording medium in the form of a card having tracking tracks for obtaining a tracking signal and clock tracks for obtaining a clock signal arranged alternately and record zones for recording information between each of the tracking tracks and each of the clock tracks, and apparatus for recording-/reproducing information using the recording medium.

19 Claims, 9 Drawing Sheets

OPTICAL INFORMATION RECORDING MEDIUM AND APPARATUS FOR RECORDING/REPRODUCING INFORMATION USING THE SAME

BACKGROUND OF THE INVENTION

1. Field of the Invention

The present invention relates to an optical information recording medium and apparatus for recording/reproducing information in and from the medium. More particularly, the present invention relates to an optical information recording medium in the form of a card having tracks to obtain a tracking signal and a clock signal, and also relates to apparatus for recording/reproducing information using the recording medium.

2. Description of the Prior Art

In the art there have been known and used various kinds of recording media in which information can be recorded utilizing light and from which the recorded information can be read out optically. These known optical recording media have various forms such as disk, card, tape, etc. Among them the card-shaped optical recording medium (hereinafter referred to simply as an optical card) has many advantages. It is small in size and light in weight for its large recording capacity. Man can carry it very conveniently. For these advantages the optical card is expected to have an increasing demand.

Recording of information on the optical card is carried out by scanning the card by a beam of light modulated in accordance with information imparted thereto and condensed to a very small spot. With the scanning, the information is recorded as lines of record pits (information track) which are optically detectable. In order to perform the optical recording correctly without any trouble such as crossing of information tracks according to the recording method, it is essential to precisely control the position at which the modulated beam is projected. In this optical recording method, the beam projection position must be controlled in a direction normal to the direction of scanning (this control is referred to as auto-tracking). In addition, it is necessary to generate a clock signal useful for the correction of possible variations in scanning speed.

Concerning the above-mentioned optical card, we, the inventors of the present invention, have received some technical disclosure from the Drexler Technology Corporation. From the technical disclosure we have known that such optical cards have already been proposed which have tracks previously formed on the card to obtain a tracking signal and a clock signal. For the sake of explanation, a first example of such optical cards as disclosed is shown in the accompanying drawings, FIGS. 1A and 1B.

FIG. 1A is a schematic plan view of the prior art optical card.

The optical card 31 has clock tracks $32_1$, $32_2$, $32_3$, $32_4$, . . . in the form of broken lines previously formed by recording clock signals. The clock tracks are arranged at regular intervals on the optical card so as to provide recording zones $34_1$, $34_2$, $34_3$, . . . between the clock tracks.

FIG. 2 is an enlarged view of the surface of the optical card 31 showing how to record information on the optical card.

In recording some information, three beams are projected from an optical recording head. The projected beams are focused to form very small spots $S_1$, $S_2$ and $S_3$ on the card. With the relative movement between the optical card and the optical recording head, these spots scan the card surface in the direction of arrow a. Of the three spots the middle spot $S_2$ is used to record information. At the step shown in FIG. 1B, the spot $S_2$ has just recorded a piece of information as a record pit 35 in the record zone $34_1$. The remaining two spots $S_1$ and $S_3$ are used to generate a tracking signal and a clock signal in the following manner.

The spots $S_1$ and $S_3$ are reflected on the card surface. One of the reflected lights, that of the spot $S_1$ or that of the spot $S_3$ is guided to a detector provided in the optical recording head. From the reflected light the detector detects a tracking signal by a known method such as push-pull. In accordance with the tracking signal, the spots $S_1$, $S_2$ and $S_3$ are moved together in the direction of arrow b normal to the scanning direction a so that the spot $S_1$ can always trace the clock track $32_1$ correctly. This control of the spot positions enables the forming of the record pits 35 correctly along the clock track $32_1$ and prevents information tracks from crossing each other. Simultaneously with the detection of the tracking signal, the reflected light of $S_3$ or $S_1$ reproduces the clock signal which is used as a clock for recording signals.

The reproduction of the recorded information can be carried out in a similar manner to the above.

The above-shown optical card, however, has disadvantages. Generally, the recording or reproducing transfer speed of the optical card is low and, therefore, the frequency of change of the tracking signal due to the noncontinuity of the clock track lies near the servo area of the auto-tracking. Because of this fact the auto-tracking is adversely affected by the change of the tracking signal. This is an important drawback of the above-shown prior art optical card.

In the above-mentioned technical disclosure there has been shown also an optical card developed to solve the above problem. This optical card is shown in FIGS. 2A and 2B as a second example of the prior art.

FIG. 2A is a schematic plan view of the optical card. The optical card 41 has clock tracks $42_1$, $42_2$, $42_3$, . . . tracking tracks $43_1$, $43_2$, $43_3$, . . . previously formed on the card. Between the clock tracks and the tracking tracks there are provided record zones $44_1$, $44_2$, . . . In other words, one clock track is along one side of one record zone and one tracking track is along the other side of the record zone. The clock track is again in the form of broken line. But, in this second example, the tracking track is formed as unbroken line.

FIG. 2B is an enlarged view of the record side surface of the optical card 41 showing how to record information on the card.

The method of recording on the optical card is basically the same as that of the first example shown in FIG. 1. Again, three spots scan the card surface in the direction of arrow a. The middle spot $S_2$ is used to record information as a record pit 45. However, in this example, the spot $S_3$ traces the tracking tracks $43_1$, $43_2$, . . . to generate a tracking signal. The first spot $S_1$ is projected on the clocks $42_1$, $42_2$, . . . to obtain the necessary clock signal.

As obviously seen, the second example enables to detect the tracking signal independently of the clock signal thereby assuring correct autotracking.

However, since a part of the surface of the optical card is occupied additionally by the tracking tracks, the recording capacity per unit area is necessarily decreased. Obviously, the effective area for recording in the second optical card 41 is smaller than that in the first example shown in FIG. 1.

SUMMARY OF THE INVENTION

Accordingly it is a general object of the present invention to overcome the drawbacks of the prior art as mentioned above.

More specifically it is a principal object of the invention to provide an optical information recording medium which enables correct auto-tracking without decreasing the recording capacity per unit area, and to provide apparatus for recording/reproducing information in and from the recording medium.

According to the present invention, the above object is attained by an optical information recording medium in the form of a card having alternate lines of tracking track and clock track previously formed for obtaining a tracking signal and a clock signal, and recording zones useful for recording information provided between every two lines of the tracks. The present invention provides also an apparatus for recording/reproducing information using the recording medium.

Other and further objects, features and advantages of the invention will appear more fully from the following description taken in connection with the accompanying drawings.

DETAILED DESCRIPTION OF THE PREFERRED EMBODIMENT

Figure 3:
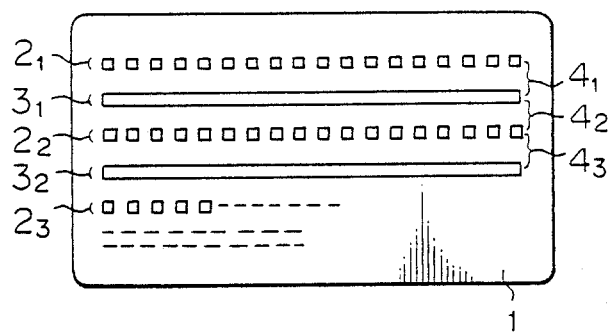
FIG. 3 is a schematic plan view of an embodiment of the optical card according to the present invention.

An embodiment of the optical card according to the present invention is schematically shown in FIG. 3.

The optical card 1 has alternate lines of clock track 2 and tracking track 3 previously formed on the optical card. The track lines are arranged regularly with equal spaces which provide recording zones $4_1$, $4_2$, $4_3$, . . . for recording information therein. The clock tracks $2_1$, $2_2$, $2_3$, . . . are in the form of a broken line on which clock signals have been previously recorded intermittently at certain constant periods. The tracking tracks $3_1$, $3_2$, $3_3$, . . . are in the form of unbroken line from which a tracking signal can be obtained.

Figure 1A:
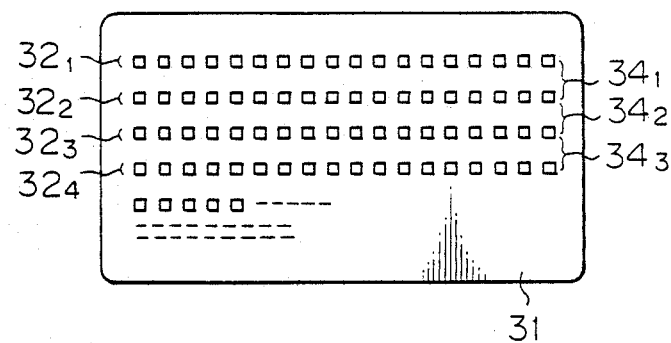
FIG. 1A is a schematic plan view of a first example of the prior art optical card and FIG. 1B is an enlarged view thereof showing how to record information on the card.
Figure 1B:
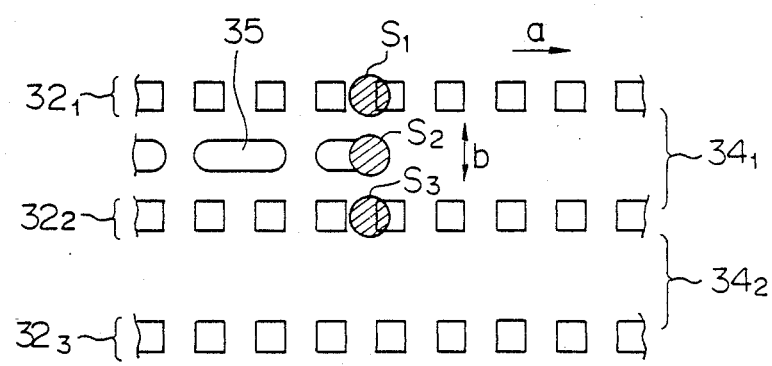
Figure 2A:
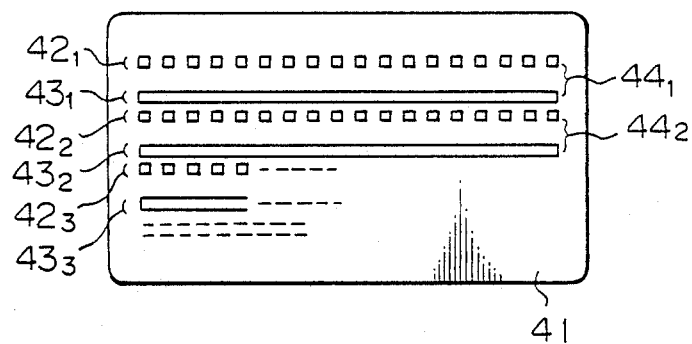
FIG. 2A is a schematic plan view of a second example of the prior art optical card and FIG. 2B is an enlarged view thereof showing how to record information on the card.
Figure 2B:
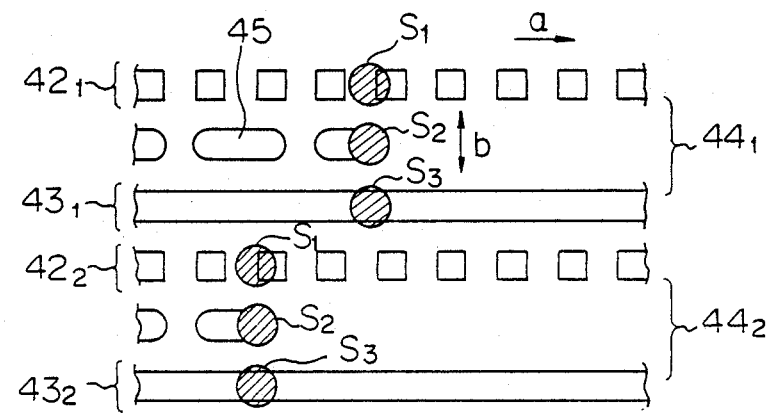

In this optical card according to the invention, every recording zone lies between every two lines, i.e. between a clock track and a tracking track. Therefore, this optical card has a large effective area for recording sufficient information to obtain substantially the same recording density as that obtained by the first example of the prior art shown in FIG. 1. In addition, this optical card according to the invention has also a tracking track provided for producing a tracking signal, which assures very precise and correct auto-tracking.

Figure 4:
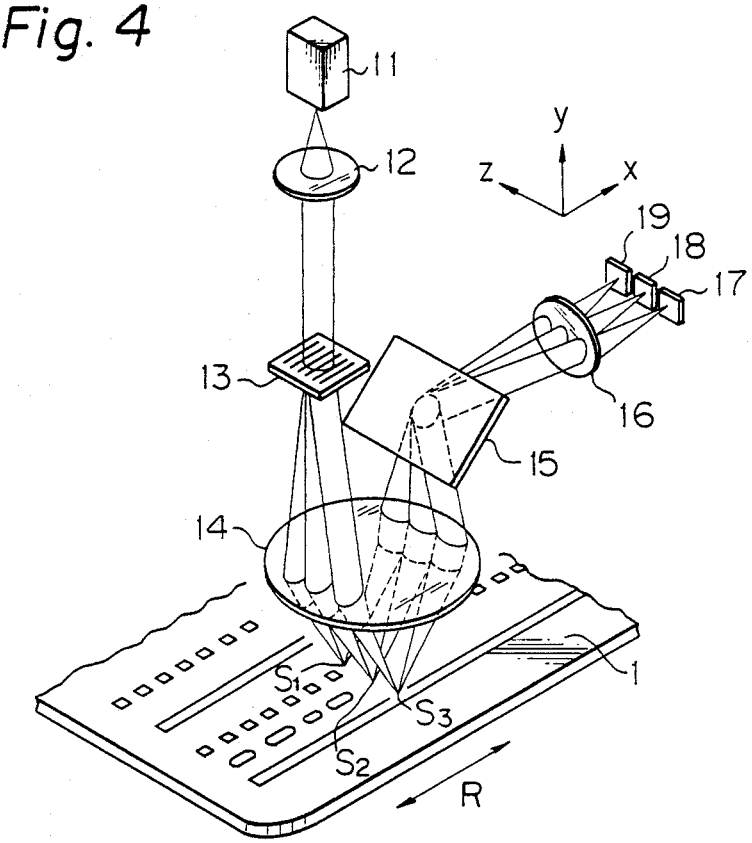
FIG. 4 is a perspective view of an embodiment of the apparatus for recording/reproducing information according to the present invention.
Figure 5:
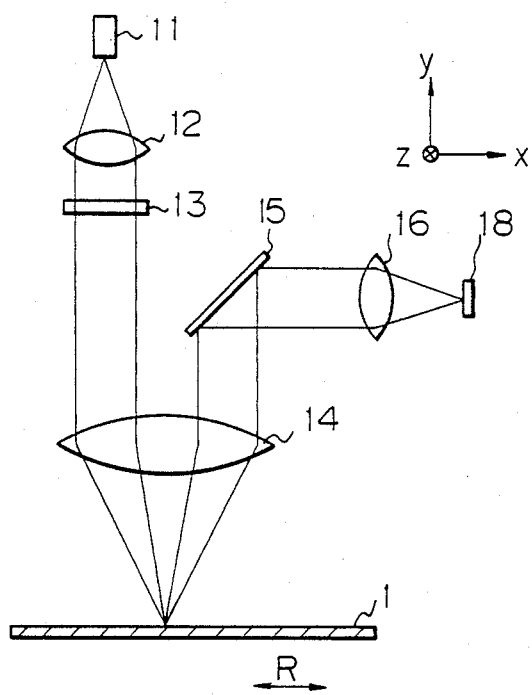
FIG. 5 is a sectional side view of the recording/reproducing apparatus.

An embodiment of the recording/reproducing apparatus using the above optical information recording medium is shown in a perspective view in a FIG. 4 and in sectional side view in FIG. 5.

In the apparatus a beam of light is emitted from a light source 11 and collimated by a collimater lens 12. The beam is then split into three beams by a diffraction grating. These beams enter an objective lens 14 which focuses these three beams on the surface of an optical card 1 as shown in FIG. 3. Thus, three beam spots $S_1$, $S_2$ and $S_3$ are formed on the optical card 1. The optical card is being moved in the direction of arrow R by driving means not shown. With this movement, the surface of the optical card 1 is scanned by the beam spots in the direction in which the tracking and clock tracks extend.

Figure 6:
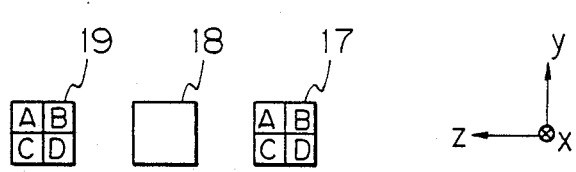
FIG. 6 is a view illustrating the construction of the photo detector in the embodiment of the apparatus.

The reflected beams of the beam spots $S_1$, $S_2$ and $S_3$ from the card surface enter again the objective lens which transmits the reflected beams to a mirror 15. The mirror reflects the three beams toward a condenser lens 16 through which the reflected beams are projected on photo detectors 17, 18, 19 arranged on the focal plane of the lens. As shown in FIG. 6, the three photo detectors are in alignment with Z-axis. Further, the light-receiving surfaces of the photo detectors 17 and 18 are divided into four sections A, B, C and D.

The manner of recording information on the optical card will be described with reference to FIG. 7 which is an enlarged view of the record side surface of the optical card. For the sake of explanation it is assumed that the apparatus is now recording a piece of information in the recording zone $4_1$.

The beam spots $S_1$, $S_2$ and $S_3$ are being projected on the clock track $2_1$, recording zone $4_1$ and tracking track $3_1$ respectively. As, previously mentioned, the optical card 1 is moved by driving means, these spots scan the card in the direction of arrow a (scanning direction). In the manner previously described, the reflected light of the spot $S_1$ is projected on the photo detector 17 to reproduce a clock signal. The reflected light of the spot $S_3$ enters the photo detector 19 to detect a tracking signal according to the so-called push-pull method. To this end, the light-receiving surface of the photo detector 19 is divided into area A+C and area B+D by a dividing line extending parallel with the y-axis as shown in FIG. 6. The y-axis extends in the direction of the tracking track. If the spot $S_3$ deviates from the tracking track $3_1$, the area A+C and the area B+D have different light intensities relating to the incident light on each area. Therefore, a tracking signal can be obtained by comparing the two light intensity signals with each other.

In accordance with the detected tracking signal, the spots $S_1$, $S_2$, $S_3$ are together moved in the direction of arrow b normal to the scanning direction by a tracking means not shown (tracking means may be, for example, means for moving the objective lens 14 in the direction of Z-axis in FIG. 3). In this manner, auto-tracking is performed and a record pit 5 is recorded in the recording zone $4_1$ correctly along the tracking track $3_1$ by the spot $S_2$.

During the above recording operation, the photo detector 19 detects also a focusing signal for auto-focusing in addition to the above tracking signal for auto-tracking. Herein, the term "auto-focusing" means a control for keeping spots correctly focused on the record side surface of the optical card. The principle of the detection of focusing signal will be described in brief with reference to FIG. 8.

Figure 8:
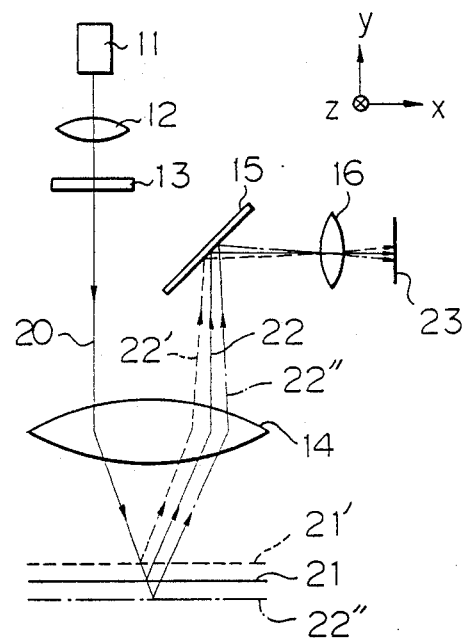
FIG. 8 is a view illustrating the principle of the auto-focusing in the embodiment of the apparatus.

In FIG. 8, like reference numerals to FIG. 5 represent the same or corresponding numerals. The record side surface of the optical card is designated by 21. The incident light 20 to the surface 21 forms the above-mentioned spot $S_3$. The beam 20 obliquely enters the record surface 21 and is reflected as the reflected beam 22.

When the spots are correctly focused on the record surface of the card, the reflected beam 22 enters the mirror 15 travelling in parallel with the incident beam 20, and then the reflected beam is guided to the detection surface 23. If the record surface deviates up or down from the focal plane to a position suggested by lines 21′ or 21″, the reflected beam no longer travels in parallel with the incident beam. The reflected beam enters the mirror 15 as the beam 22′ or 22″. Consequently, the position at which the reflected beam enters the detection surface 23 is shifted in the direction of the y-axis in FIG. 8. Therefore, the light intensity distribution in the direction of the y-axis changes accordingly. This change can be detected as the difference in output between the light receiving areas A+B and C+D of the photo detector 19. From this the result of the detection there is obtained a focusing signal. In accordance with the focusing signal the objective lens 14 is moved in a direction along the optical axis. In this manner, auto-focusing is performed. In this connection it is to be noted that the light intensity of the spots $S_1$ and $S_3$ is so set by the above-mentioned diffraction grating 13 as to be a level far lower than that of the spot $S_2$ (for instance, the level of the former is only 1/5 of the latter). Therefore, the spots $S_1$ and $S_3$ cannot write any recording information by themselves. The reason for this is that if any information were recorded in the tracking track and/or the clock track, it would disturb the detection of tracking signal and/or clock signal later.

Figure 7:
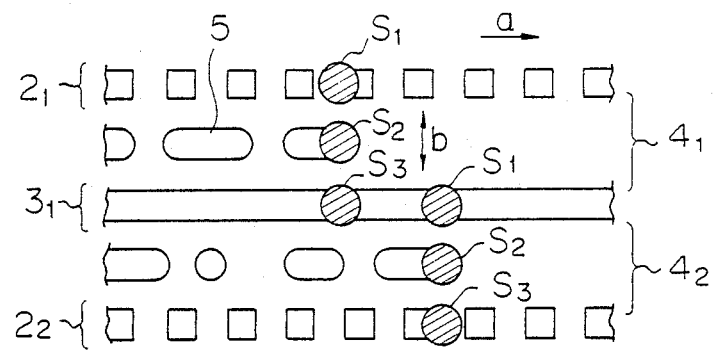
FIG. 7 is an enlarged view of the embodiment of the optical card showing how to record information on it.

In order to record information in the next record zone $4_2$, the optical system is moved relative to the optical card in the direction of the z-axis in FIG. 4 until the spots $S_1$, $S_2$ and $S_3$ are projected on the tracking track $3_1$, recording zone $4_2$ and clock track $2_2$ respectively as shown in the lower part of FIG. 7. After that, the spots start scanning the tracking track $3_1$, record zone $4_2$ and clock track $2_2$. The photo detector 17 receives the reflected light of the spot $S_1$ to perform the auto-tracking and auto-focusing. The photo detector 19 receives the reflected light from the spot $S_3$ to reproduce the clock signal. The spot $S_2$ writes information in the record zone $4_2$. In this manner, recording is continued.

As readily understood from the above, in the apparatus according to the present invention, two of the three spots are used exclusively for reading tracking track and clock track respectively. This assures problemless auto-tracking. Furthermore, the present invention enables one to fully use all of available record zones for recording information by changing over the operation successively in the manner described above.

The recorded information can be reproduced in the same manner as that for recording described above using the same apparatus as used for recording.

Figure 9:
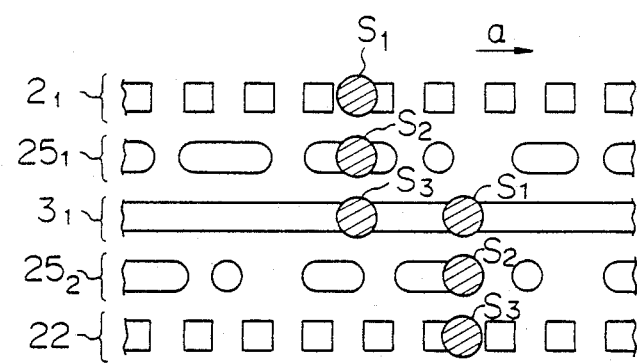
FIG. 9 is an enlarged view of the embodiment of the optical card showing how to reproduce the information recorded in it.

FIG. 9 illustrates the manner of reproduction from an optical card on which information has been recorded in the manner described above.

Referring to FIG. 9 the optical card has clock tracks $2_1, 2_2, \ldots$, tracking track $3_1 \ldots$ and information tracks $25_1, 25_2 \ldots$ between clock track and tracking tracks as previously recorded. Each the information track 25 is composed of a line of record pits.

Assuming that the information recorded in the track $25_1$, is now being read out, the spots $S_1$, $S_2$ and $S_3$ scan the clock track $2_1$, information track $25_1$ and tracking track $3_1$ respectively in the direction of arrow a. The photo detector 17 reproduces the clock signal, the photo detector 19 generates outputs for auto-tracking and auto-focusing and the photo detector 18 reads out the information recorded in the information track $25_1$. During this operation of reproduction, the intensity of the spot $S_2$ is kept at a lower level than the spot intensity used for recording so that any recording cannot be done by the spot $S_2$ during the reproduction. The reduction of spot intensity may be accomplished, for example, by decreasing the output of the light source 11.

When the information in the next information track $25_2$ is reproduced, the spot $S_1$ scans the tracking track $3_1$, the spot $S_2$ scans the information track $25_2$ and the spot $S_3$ scans the clock track $2_2$ in the direction of arrow a. The photo detector 19 reproduces the clock signal, the photo detector 17 generates outputs for auto-tracking and auto-focusing and the photo detector 18 reads out information from the information track $25_2$. By shifing the operation from one position to another in this manner, all of the information recorded in the record zones of the optical card can be reproduced correctly.

Figure 10:
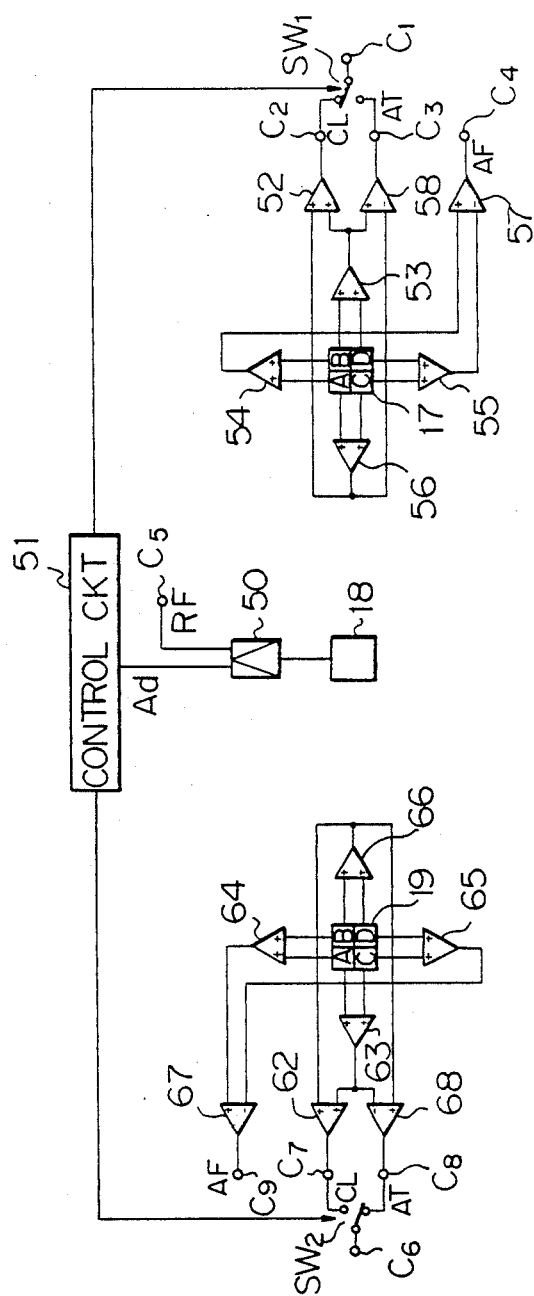
FIG. 10 is a block diagram showing a concrete form of the signal processing system in the embodiment of the apparatus.

FIG. 10 is a block diagram showing a concrete form of the signal processing system for processing the signals generated from the above-mentioned photo detectors 17, 18 and 19. In this example, such as optical card is used which contains address signals previously recorded in the record zones, one address per track.

Referring to FIG. 10, Ad denotes an address signal and RF does a reproduction signal. The address signal Ad and the reproduction signal RF read out are separated from each other by a separation circuit 50. In accordance with the address signal Ad, a control circuit 51 controls the closing and opening of switches $SW_1$ and $SW_2$. 52, 53, 54, 55, 56, 62, 63, 64, 65 and 66 designate summing amplifiers. 57, 58, 67 and 68 denote subtracting amplifies. $C_1$ to $C_9$ are terminals.

Assuming that information is recorded in the record zone $4_1$, at first an address signal Ad is read out by the photo detector 18. From the address signal Ad the apparatus judges the position of the tracking track relative to the record zone now to be scanned (i.e. whether the tracking track is on the left side or on the right side of the record zone). In accordance with such a judgment, the controller 51 controls the switches $SW_1$ and $SW_2$. In the relative position between the record zone $4_1$ and the tracking track $3_1$ now being discussed, the controller 51 connects the switch $SW_1$ to the terminal $C_2$ and the switch $SW_2$ to the terminal $C_8$. Therefore, the sum of outputs from the sections A, B, C, D of the light-receiving surface of the photo detector 17 is applied to the terminal $C_1$ through summing amplifiers 53, 56, 52 as a clock signal CL, which functions as a reference signal to control the recording by the spot $S_2$ through a processing circuit, not shown. On the other hand, the difference between the output of the light-receiving area A+C and the output of the light-receiving area B+D of the photo detector 19 is applied to the terminal $C_6$ through summing amplifiers 63, 66 and subtracting amplifier 68 as a tracking signal AT. This signal AT is transmitted to a tracking servo circuit (not shown) from the terminal $C_6$.

At the same time, a focusing signal AF is applied to the terminal $C_9$ through summing amplifiers 64, 65 and subtracting amplifier 67. The focusing signal AF is the difference between the output of the area A+B and the output of the area C+D of the photo detector 19. This signal AF is supplied to a focus servo circuit (not shown) from the terminal $C_9$.

When information is recorded in the next record zone $4_2$, the controller connects the switch $SW_1$ to the terminal $C_3$ and $SW_2$ to $C_7$ in response to the change of address signal Ad. Similarly to the above, a tracking signal AT appears at the terminal $C_1$, a clock signal CL at the terminal $C_6$ and a focusing signal AF at the terminal $C_4$.

The reproduction of the recorded information as shown in FIG. 9 can be performed with the same operation of the apparatus as that for recording. The shift of the positions of operating members is carried out in the same manner as described above for recording. The photo detector 18 reads out a reproduction signal RF. After separated from the address signal Ad by the separation circuit 50, the reproduction signal RF is taken out from the terminal $C_5$.

In the above embodiment of the recording/reproducing apparatus according to the invention, the tracking signal can be detected from the tracking track lying on one side or the other side of the recording zone during recording or reproduction, whichever zone it may be. This assures always accurate auto-tracking without being affected by the clock signal. While the embodiment has been shown and described to be a recording-/reproducing apparatus, it is to be understood that the above embodiment is also applicable to a recording-only apparatus or to a reproducing-only apparatus.

A modification of the above-shown recording/reproducing apparatus will be hereinafter described with reference to FIGS. 11 to 13.

Figure 11:
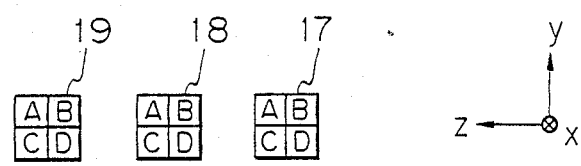
FIG. 11 is a view showing the construction of the photo detector in a modification of the above embodiment of the apparatus.

In the modification, the light-receiving surface of the photo detector 18 is divided into four sections A, B, C and D as shown in FIG. 11. Other parts of this modified apparatus correspond to those of the embodiment previously shown in FIGS. 4 and 5. Since the light-receiving surface of the photo detector 18 is divided into four sections as shown in FIG. 11, in this modification, it is possible to detect the tracking signal and focusing signal also from the reflected light of the spot $S_2$. This is an important feature of this modification.

The manner in which the modified apparatus records is entirely the same as that previously described with reference to FIG. 7. But, the manner of reproduction is different from the above. In this modification, two information tracks are read at the same time during reproduction as shown in FIG. 12.

Figure 12:
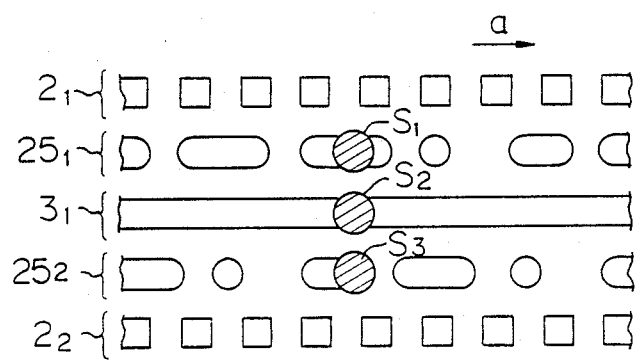
FIG. 12 is an enlarged view of the optical card showing how to reproduce the recorded information according to the modification.

Referring to FIG. 12, the optical card has clock tracks $2_1, 2_2, \ldots$, tracking tracks $3_1, 3_2, \ldots$ and information tracks $25_1, 25_2, \ldots$ performed on the record side surface of the card. Each of the information track 25 is composed of a line of record pits recorded between a clock track 2 and a tracking track 3. The first spot $S_1$ scans the information track $25_1$, the second spot $S_2$ scans the tracking track $3_1$ and the third spot $S_3$ scans the information track $25_2$ in the direction of arrow a. The photo detectors 17 and 19 read out information from the information tracks $25_1$ and $25_2$ at the same time while the photo detector 18 detects signals for auto-tracking and auto-focusing. By repeating this reproducing operation from the first track to the last one of the optical card, all the information recorded in the card can be reproduced at twice the speed of the recording speed. In this operation of reproduction it is impossible to obtain a clock signal from the clock track. However, this causes no problem because, during the reproduction operation, is is possible to produce a clock signal from the signal recorded in the information track itself (so-called self-clock).

Figure 13:
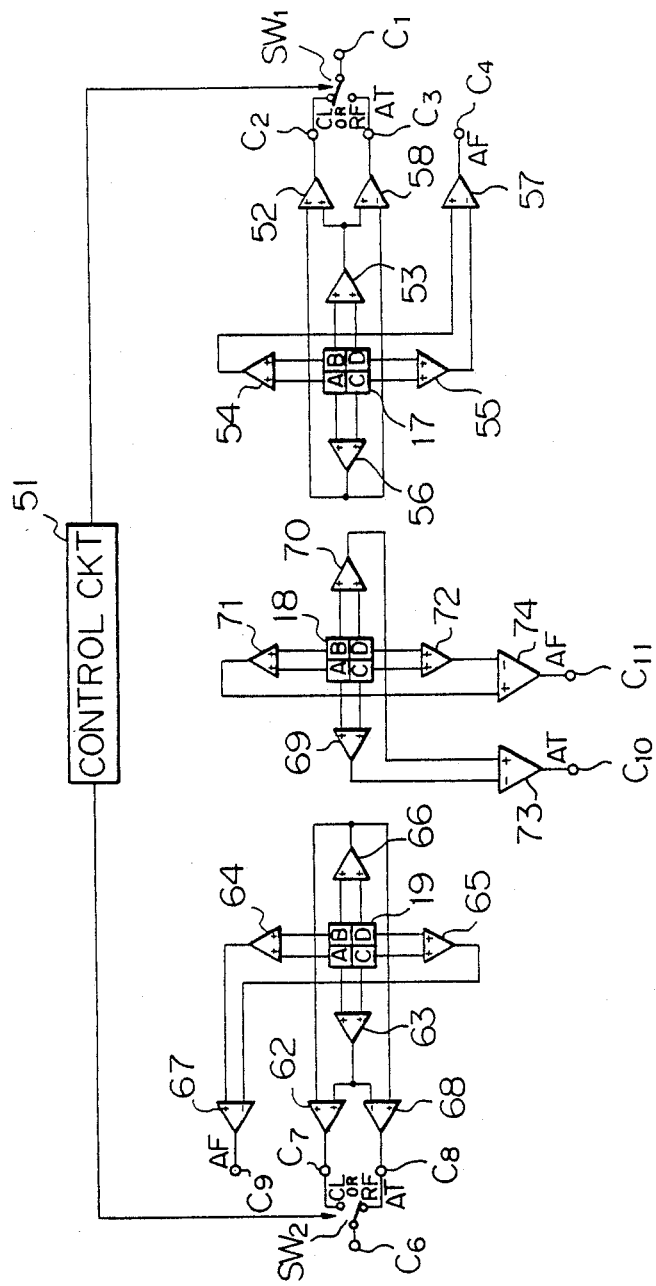
FIG. 13 is a block diagram showing a concrete form of the signal processing system in the modification.

FIG. 13 is a block diagram showing a concrete form of the system for processing the signals generated from the three photo detectors 17, 18, 19 shown in FIG. 11.

In FIG. 13, the reference numeral 51 denotes again a control circuit for controlling the closing and opening of switches $SW_1$ and $SW_2$. 52, 53, 54, 55, 56, 62, 63, 64, 65, 66, 69, 70, 71 and 72 are all summing amplifiers. 57, 58, 67, 68, 73 and 74 are subtracting amplifiers. $C_1$ to $C_{11}$ are terminals.

For recording information in the record zone $4_1$ as shown in FIG. 7, the controller 51 connects the switch $SW_1$ to the terminal $C_2$ and $SW_2$ to $C_8$ in accordance with the recording mode. Therefore, the sum of the outputs from the four light-receiving surface sections A, B, C and D of the photo detector 17 is applied to the terminal $C_1$ through the summing amplifiers 53, 56, 52 as a clock signal CL. The clock signal CL functions as a reference signal to control the recording by the spot $S_2$ through a processing circuit not shown. Applied to the terminal $C_6$ is a tracking signal AT which is the difference between the output of A+C and the output of B+D of the photo detector 19 through summing amplifiers 63, 64 and subtracting amplifier 68. This signal AT is supplied to a tracking servo circuit (not shown) from the terminal $C_6$.

At the same time, a focusing signal AF is applied to the terminal $C_9$ through summing amplifiers 64, 65 and subtracting amplifier 67. The focusing signal is the difference between the output of A+B and the output of C+D of the photo detector 19. This signal AF is transmitted to a focus servo circuit (not shown) from the terminal $C_9$.

When information is recorded in the next record zone $4_2$, the controller 51 connects the switch $SW_1$ to the terminal $C_3$ and $SW_2$ to $C_7$. Similarly to the above, a tracking signal AT appears at the terminal $C_1$, a clock signal CL at $C_6$ and a focusing signal AF at $C_4$.

In order to actuate the controller to change over the switches, an address signal may be prerecorded in the record zone for every track. In this case, the photo detector 18 reads out the address signal and transmits it to the controller 51. From the address signal, the controller judges the positional relation between the tracking track and the record zone now to be scanned (i.e. whether the tracking track is on the left side or on the right side of the record track). In accordance with such a judgment, the controller changes over the switches.

When a reproduction of the recorded information is to be carried out in the manner as illustrated in FIG. 12, a mode changeover signal is inputted externally. In response to the signal informing the apparatus of the reproduction mode, the control circuit 51 connects the switch $SW_1$ to the terminal $C_2$ and $SW_2$ to $C_7$.

Consequently, the difference between te output of $A+C$ and the output of $B+D$ of the photo detector 18 is applied to the terminal $C_{10}$ through summing amplifiers 69, 70 and subtracting amplifier 3 as a tracking signal AT. This signal AT is supplied to a tracking servo circuit (not shown) from the terminal $C_{10}$. Also, the difference between the output of $A+B$ and the output of $C+D$ of the photo detector 18 is applied to the terminal $C_{11}$ through summing amplifiers 71, 72 and subtracting amplifier 74 as a focusing signal AF. This signal AF is supplied to a focus servo circuit (not shown) from the terminal $C_{11}$. Reproduction signals read out by the photo detectors 17 and 19 are picked up from the terminals $C_1$ and $C_6$ respectively.

While the invention has been particularly shown and described with reference to preferred embodiments thereof, it will be understood that various modifications may be made therein. For example, the address signal for actuating the changeover as described in connection with the embodiment shown in FIG. 10 or FIG. 13 may be also used to inform the photo detector whether the track now being scanned is a tracking track or clock track. Further, to detect the tracking signal and the focusing signal there may be used various other detection methods than that shown in the above embodiments. The focusing signal may be detected also by the photo detector used to detect the recording/reproducing spot. In this case, the method of detecting the focusing signal may be the same as that used in the above embodiments or any other suitable method such as the so-called astigmatism method. Further, in this case, the remaining two photo detectors may be two-division type photo sensors of which one is used to detect only the clock signal and the other to detect only the tracking signal.

We claim:

1. A card-shaped optical information recording medium comprising:
    tracking tracks for producing a tracking signal, said tracking tracks each being formed as an unbroken line;
    clock tracks for producing a clock signal, at least a portion of each of said clock tracks being formed as a line intermittently broken at constant periods, and each of said tracking tracks and each of said clock tracks being alternately provided; and
    record zones in which information is to be recorded, said record zones each being provided between each of said tracking tracks and each of said clock tracks so that only one of each of said tracking tracks and each of said clock tracks is alternately positioned between two adjacent record zones.

2. A recording medium according to claim 1, wherein said tracking tracks and clock tracks are arranged alternately at constant intervals.

3. An apparatus for recording or reproducing information on or from a card-shaped optical information recording medium comprising tracking tracks each of which is formed as an unbroken line and clock tracks, at least a portion of each of said clock tracks being formed as a line intermittently broken at constant periods, each arranged alternately and record zones in which information is to be recorded and each of which is provided between each of the tracking tracks and each of the clock tracks so that only one of each of the tracking tracks and each of the clock tracks is alternately positioned between two adjacent record zones, said apparatus comprising:
    means for forming at least first, second, and third beam spots on said recording medium;
    means for projecting said first spot on the record zone to record or reproduce informaiton;
    tracking signal detection means for projecting one of said second and third beam spots on the tracking track to detect a tracking signal;
    means for changing over said tracking signal detection means in accordance with the positional relation between said projected record zone and the tracking track so as to obtain the tracking signal from the other one of said second and third spots; and
    clock signal detection means for projecting the remaining spot of the second and third spots, which is not projected on said tracking track, on the clock tract to detect a clock signal.

4. Apparatus according to claim 3, wherein said apparatus further comprises means for detecting a focusing signal from one of the second and third spots.

5. Apparatus according to claim 3, wherein said beam spot forming means comprises a light source, a grating for splitting the beam emitted from said light source and a condenser lens for focusing said split beams on the recording medium.

6. Apparatus according to claim 3, wherein said tracking signal detection means and clock signal detection means are constituted of two photo detectors disposed to receive the lights from the second and third spots respectively.

7. Apparatus according to claim 6, wherein said photo detector has a light-receiving surface divided into two areas by a dividing line parallel to the direction along the length of said tracking track and wherein said tracking signal is derived from the difference between the detected signals by said two areas.

8. Apparatus according to claim 6, wherein said changeover means comprises a switch through which any one of said two photo detectors is selectively connected to tracking control means.

9. Apparatus according to claim 3, wherein the light intensity of the second and third beam spots is lower than that of the first beam spot.

10. Apparatus according to claim 3, wherein said recording or reproducing means includes a photo detector disposed to receive the light from the first beam spot.

11. An apparatus for recording and reproducing information using a card-shaped optical information recording medium comprising tracking tracks each of which is formed as an unbroken line and clock tracks each of which is formed as a line intermittently broken at constant periods, said tracking tracks and clock tracks each being arranged alternately, and record zones in which information is to be recorded and each of which is provided between each of the tracking tracks and each of the clock tracks so that only one of each of the tracking tracks and each of the clock tracks is alternately positioned between two adjacent record zones, said apparatus comprising;

means for producing and projecting at least three beam spots on the recording medium, said producing and projecting means projecting said beam spots on the record zone, the tracking track and clock track, respectively, at the time of recording to write information in said record zone while detecting a tracking signal and a clock signal, and said producing and projecting means projects said beam spots on the tracking track and two or more record zones respectively at the time of reproduction to simultaneously read out the recorded information in said two or more record zones while detecting the tracking signal;

tracking signal detection means for detecting the tracking signal from the beam spot projected on the tracking track at the time of recording;

means for changing over said tracking signal detection means in accordance with the positional relation between said projected record zone and the tracking track so as to always obtain the tracking signal from the beam spot projected on the tracking track at the time of recording;

and clock signal detection means for detecting the clock signal from the beam spot projected on the clock track at the time of recording.

12. Apparatus according to claim 11, wherein at the time of recording, information is written in by a first one of said beam spots while detecting the tracking signal and clock signal by second and third spots, and at the time of reproduction, information is read out by the second and third spots while detecting the tracking signal by the first spot.

13. Apparatus according to claim 12, wherein said apparatus comprises means for forming at least three beam spots on the recording medium; means for detecting the tracking signal from any one of said first, second and third spots; and means for changing over the spot for the detection of the tracking signal from one to another in accordance with the positional relation between the projected record zone and the tracking track.

14. Apparatus according to claim 13, wherein said apparatus further comprises means for detecting a focusing signal from any one of the first, second and third spots.

15. Apparatus according to claim 12, wherein said beam spot forming means comprises a light source, a grating for splitting the beam emitted from said light source and a condenser lens for focusing said split beams on the recording medium.

16. Apparatus according to claim 12, wherein said tracking signal detection means comprises three photo detectors disposed to receive the lights from the first, second and third spots respectively.

17. Apparatus according to claim 16, wherein said photo detector has a light-receiving surface divided into two areas by a dividing line parallel to the direction along the length of the tracking track and said tracking signal is derived from the difference between the detected signals by said two areas.

18. Apparatus according to claim 16, wherein said changeover means includes a switch through which any one of the photo detectors disposed to receive the lights from the second and third spots is selectively connected to tracking control means.

19. Apparatus according to claim 12, wherein the light intensity of the second and third spots is lower than that of the first spot.

* * * * *